(12) United States Patent
Abenaim et al.

(10) Patent No.: US 8,829,446 B2
(45) Date of Patent: Sep. 9, 2014

(54) TILE FOR DETECTOR ARRAY OF IMAGING MODALITY HAVING SELECTIVELY REMOVABLE/REPLACEABLE TILE SUB-ASSEMBLIES

(75) Inventors: Daniel Abenaim, Lynnfield, MA (US); Martin Choquette, Exeter, NH (US); Lane Howitt, Reading, MA (US)

(73) Assignee: Analogic Corporation, Peabody, MA (US)

( * ) Notice: Subject to any disclaimer, the term of this patent is extended or adjusted under 35 U.S.C. 154(b) by 143 days.

(21) Appl. No.: 13/440,268

(22) Filed: Apr. 5, 2012

(65) Prior Publication Data

US 2013/0264483 A1 Oct. 10, 2013

(51) Int. Cl.
*G01T 1/20* (2006.01)
(52) U.S. Cl.
USPC .................................. 250/363.01
(58) Field of Classification Search
USPC .................................. 250/363.01
See application file for complete search history.

(56) References Cited

U.S. PATENT DOCUMENTS

| | | | |
|---|---|---|---|
| 6,510,195 B1 * | 1/2003 | Chappo et al. | 378/19 |
| 7,438,471 B2 | 10/2008 | Tybinkowski et al. | |
| 7,582,879 B2 | 9/2009 | Abenaim et al. | |
| 2007/0053479 A1 | 3/2007 | Sadatomo et al. | |
| 2007/0053483 A1 | 3/2007 | Nagata et al. | |
| 2008/0165921 A1 | 7/2008 | Tkaczyk et al. | |
| 2013/0077737 A1 | 3/2013 | Fasoli | |

OTHER PUBLICATIONS

Non-Final Office Action in U.S. Appl. No. 13/440,432 dated Apr. 15, 2014, 15 pgs.

\* cited by examiner

*Primary Examiner* — David Porta
*Assistant Examiner* — Hugh H Maupin
(74) *Attorney, Agent, or Firm* — Cooper Legal Group LLC

(57) ABSTRACT

Among other things, one or more tiles for an indirect-conversation radiation detector array are provided herein. Respective tiles comprise a detector sub-assembly and an electronic sub-assembly, which are operably coupled together, yet selectively removable, via a connection interface. When an electronic sub-assembly portion of a tile, which comprises a signal acquisition system (e.g., an integrated circuit, such as an application specific integrated circuit (ASIC)), functions improperly, the electronic sub-assembly portion of the tile may be selectively removed for repair/replacement without removing and/or replacing the detector sub-assembly (e.g., which may be much more costly to replace). Similarly, when the detector sub-assembly portion of a tile functions improperly, the detector sub-assembly portion of the tile may be selectively removed for repair/replacement without removing and/or replacing the electronic sub-assembly portion of the tile (e.g., although some manipulation of the properly functioning sub-assembly may occur).

20 Claims, 9 Drawing Sheets

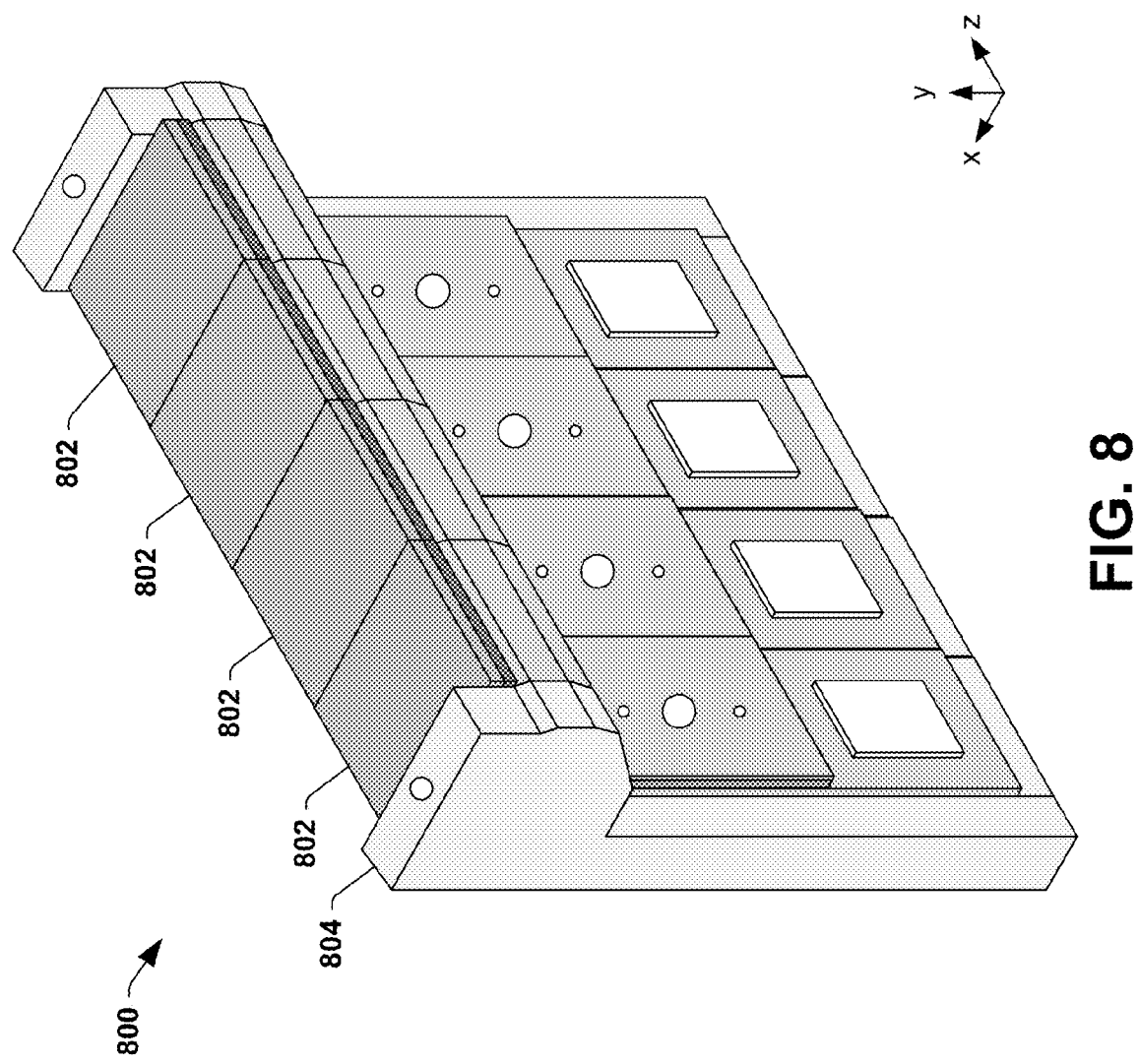

TILE FOR DETECTOR ARRAY OF IMAGING MODALITY HAVING SELECTIVELY REMOVABLE/REPLACEABLE TILE SUB-ASSEMBLIES

BACKGROUND

The present application relates to an indirect conversion, radiation detector array with replaceable elements. It finds particular application in the field of computed tomography (CT) imaging utilized in medical, security, and/or industrial applications, for example. However, it also relates to other radiation modalities where an indirect-conversion detector array may be useful.

Today, CT and other imaging modalities (e.g., mammography, digital radiography, etc.) are useful to provide information, or images, of interior aspects of an object under examination. Generally, the object is exposed to radiation (e.g., X-rays, gamma rays, etc.), and an image(s) is formed based upon the radiation absorbed and/or attenuated by the interior aspects of the object, or rather an amount of radiation photons that is able to pass through the object. Typically, highly dense aspects of the object (or aspects of the object having a composition comprised of higher atomic number elements in the case of duel-energy) absorb and/or attenuate more radiation than less dense aspects, and thus an aspect having a higher density (and/or high atomic number elements), such as a bone or metal, for example, will be apparent when surrounded by less dense aspects, such as muscle or clothing.

Radiology imaging modalities generally comprise, among other things, one or more radiation sources (e.g., an X-ray source, Gamma-ray source, etc.) and a detector array comprised of a plurality of pixels that are respectively configured to convert radiation that has traversed the object into signals that may be processed to produce the image(s). As an object is passed between the radiation source(s) and the detector array, radiation is absorbed/attenuated by the object, causing changes in the amount/energy of detected radiation.

In some applications, such as in security and/or industrial applications, there is a trend toward high throughput imaging. For example, a baggage inspection apparatus at an airport may be designed to image 200 or more bags per hour. In such applications, the radiology imaging modality is typically configured to acquire information (e.g., X-ray information) sufficient to produce the image(s) while the object under examination is being continuously translated through the examination region.

There is also a trend in some applications, such as in security and/or industrial applications, for volume imaging, where a three-dimensional (3D) image of the object is generated. It will be appreciated that a 3D image typically provides substantially more detail about the object under examination than a two-dimensional (2D) image, which may improve automatic and/or manual threat detection, for example. To generate such a 3D image, the object is typically divided into a plurality of slices and each slice is viewed from a plurality of angles, typically by rotating the radiation source(s) and/or detector array about the object as it is being examined.

To generate a volumetric image of an object in a high throughput environment a large number of slices of the object typically have to be acquired concurrently. Therefore, the detector array must be large enough to accommodate examining numerous slices of the object concurrently. However, detector measurement systems (DMSS) for such imaging modalities present numerous challenges due to the number of detector pixels required, and therefore the number of channels necessary (e.g., which may be in the hundreds of thousands) to achieve a desired image resolution using such a large detector.

The advent of high integration measurement integrated circuits (ICs), which may comprise a plurality of channels per chip (e.g., such as 64, 128, 256, etc. channels per chip) (e.g., where respective channels are coupled to one pixel), allow the design of smaller self-contained elements that can be assembled into larger detector arrays. In U.S. Pat. No. 7,582,879, assigned to Analogic Corporation, one such self-contained module is described. As provided for therein, the elements, which may be referred to as tiles, are constructed of, among other things, a scintillator, a photodetector array, and an integrated circuit. Respective tiles are fully self-contained and may be coupled together to form what is referred to as a super module, and super modules may be coupled together to form the detector array. When the scintillator, photodetector array, integrated circuit, and/or another component of the module functions improperly, the tile can be replaced without having to replace the entire detector array, for example.

While the self-contained module described in U.S. Pat. No. 7,582,879 has proven effective, there are areas for improvement. For example, when a component of the tile functions improperly, the entire tile must be replaced. That is, individual components of the tile cannot be replaced.

SUMMARY

Aspects of the present application address the above matters, and others. According to one aspect a tile for an indirect-conversation radiation detector assembly is provided. The tile comprises a scintillator element, a substrate having a top surface and a bottom surface, and an array of photodetectors disposed on the top surface of the substrate and operably coupled with the scintillator element. The tile also comprises a first connectivity pattern disposed on the bottom surface of the substrate and electrically coupled to the array of photodetectors. The tile further comprises a first circuit coupled to the first connectivity pattern, a second circuit coupled to a signal acquisition system, and a connection interface for electrically connecting the first circuit to the second circuit to deliver electrical signals generated by the array of photodetectors to the signal acquisition system.

According to another aspect, a tile for an indirect-conversation radiation detector assembly is provided. The tile comprises a detector sub-assembly comprising a scintillator element, an array of photodetectors operably coupled to the scintillator element, and a first circuit, operably coupled to the array of photodetectors, for delivering signals generated by photodetectors of the array to a signal acquisition system. The tile also comprises an electronic sub-assembly comprising the signal acquisition system and a second circuit for delivering signals generated by photodetectors of the array to the signal acquisition system. The tile further comprises a connection interface for operably coupling the first circuit to the second circuit to provide for selectively decoupling the detector sub-assembly from the electronic sub-assembly.

According to another aspect, a radiology imaging system is provided. The system comprises a radiation source configured to emit radiation and a detector array comprised of a plurality of selectively removable tiles configured to detect at least some of the emitted radiation, where at least some of the selectively removable tiles comprise a detector sub-assembly comprising a scintillator element, an array of photodetectors operably coupled to the scintillator element, and a first circuit, operably coupled to the array of photodetectors, for delivering signals generated by photodetectors of the array to a signal acquisition system. At least some of the selectively removable tiles further comprise an electronic sub-assembly comprising the signal acquisition system and a second circuit for delivering signals generated by photodetectors of the array to the signal acquisition system. At least some of the selectively removable tiles also comprise a connection interface for operably coupling the first circuit to the second circuit to provide for selectively decoupling the detector sub-assembly from the electronic sub-assembly.

Those of ordinary skill in the art will appreciate still other aspects of the present application upon reading and understanding the appended description.

FIGURES

The application is illustrated by way of example and not limitation in the figures of the accompanying drawings, in which like references generally indicate similar elements and in which:

FIG. 8 illustrates a side/perspective view of an example detector module of an example detector array.

DESCRIPTION

Figure 1:
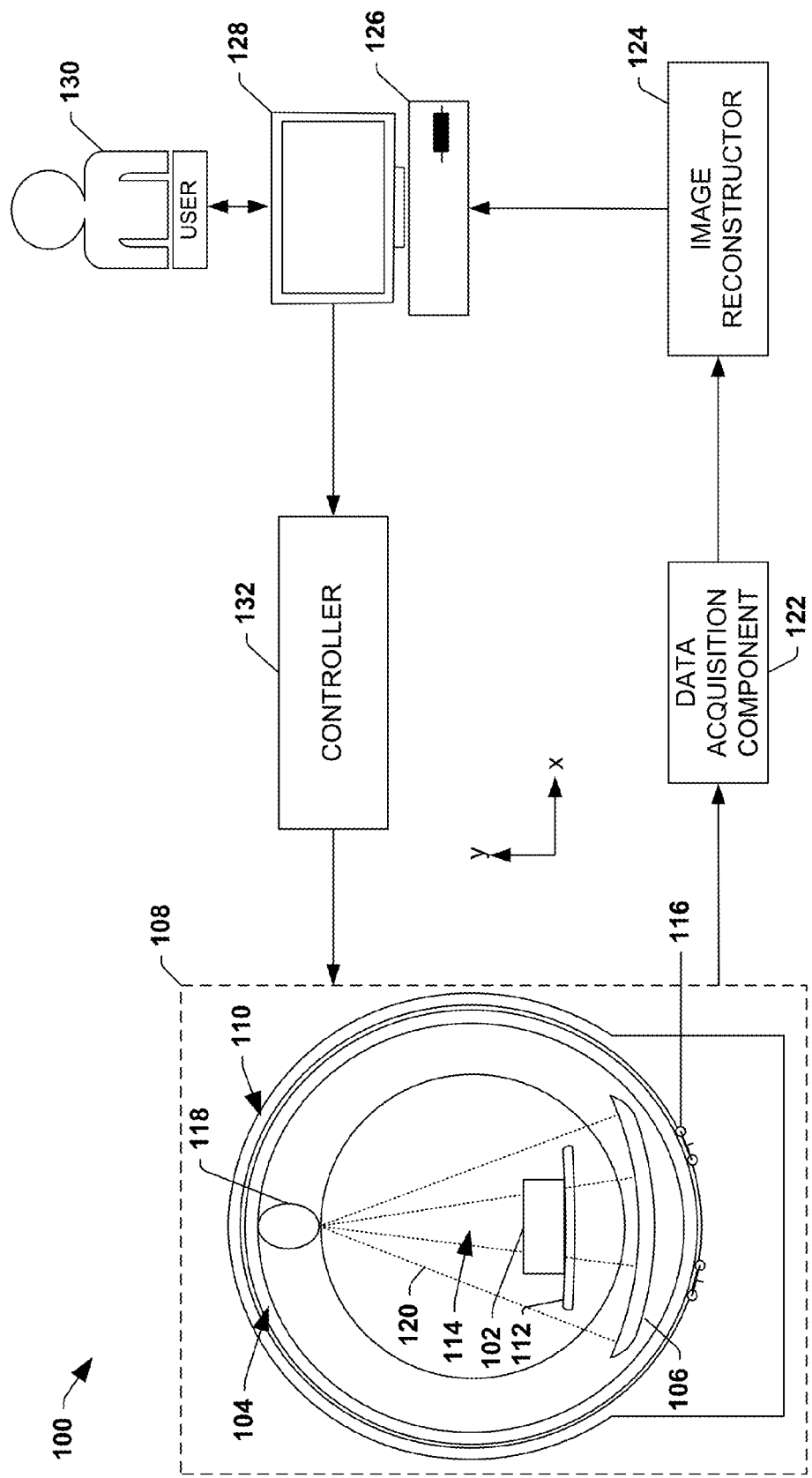
FIG. 1 illustrates an example environment of an imaging modality.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Among other things, one or more tiles for an indirect-conversation radiation detector assembly are provided for herein. The tiles comprise a detector sub-assembly and an electronic sub-assembly, which are operably coupled together via a connection interface. When the electronic sub-assembly, which comprises a signal acquisition system (e.g., an integrated circuit, such as an application specific integrated circuit (ASIC)), functions improperly, the electronic sub-assembly portion of the tile may be replaced without replacing the detector sub-assembly (e.g., which may be much more costly to replace). Similarly, when the detector sub-assembly functions improperly, the detector sub-assembly portion of the tile may be replaced without replacing the electronic sub-assembly. Although, in another embodiment, one or more portions of the detector assembly (and/or the electronic sub-assembly) that are functioning properly may or may not be replaced and/or otherwise manipulated to remove and/or replace one or more portions of the detector assembly (and/or the electronic sub-assembly) that are functioning improperly.

FIG. 1 is an illustration of an example environment 100 comprising an example radiation imaging modality that may be configured to generate data (e.g., images) representative of an object 102 or aspect(s) thereof under examination. It will be appreciated that the features described herein may find applicability to other imaging modality besides the example computed tomography (CT) scanner illustrated in FIG. 1. For example, the tiles may find applicability to other types of imaging modalities, such as line scanners and/or other systems comprising an indirect conversation detector array. Moreover, the arrangement of components and/or the types of components included in the example environment 100 are for illustrative purposes only. For example, as will be described in more detail below, at least a portion of a data acquisition component 122 may be comprised within tiles of a detector array 106.

In the example environment 100, an examination unit 108 of the imaging modality is configured to examine one or more objects 102. The examination unit 108 can comprise a rotating gantry 104 and a (stationary) support structure 110 (e.g., which may encase and/or surround as least a portion of the rotating gantry 104 (e.g., as illustrated with an outer, stationary ring, surrounding an outside edge of an inner, rotating ring)). During an examination of the object(s) 102, the object(s) 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about the object(s) 102 by a rotator 116, such as a motor, drive shaft, chain, roller truck, etc.

The rotating gantry 104 may surround a portion of the examination region 114 and may comprise one or more radiation sources 118 (e.g., an ionizing x-ray source, gamma radiation source, etc.) and a detector array 106, comprised of a plurality of pixels, that is mounted on a substantially diametrically opposite side of the rotating gantry 104 relative to the radiation source(s) 118.

During an examination of the object(s) 102, the radiation source(s) 118 emits fan, cone, wedge, and/or other shaped radiation 120 configurations from a focal spot(s) of the radiation source(s) 118 (e.g., a point within the radiation source(s) 118 from which radiation 120 emanates) into the examination region 114. It will be appreciated that such radiation 120 may be emitted substantially continuously and/or may be emitted intermittently (e.g., a brief pulse of radiation is emitted followed by a resting period during which the radiation source 118 is not activated).

As the emitted radiation 120 traverses the object(s) 102, the radiation 120 may be attenuated differently by different aspects of the object(s) 102. Because different aspects attenuate different percentages of the radiation 120, an image(s) may be generated based upon the attenuation, or variations in the number of photons that are detected by the detector array 106. For example, more dense aspects of the object(s) 102, such as a bone or metal plate, may attenuate more of the radiation 120 (e.g., causing fewer photons to strike the detector array 106) than less dense aspects, such as skin or clothing.

The detector array 106 can comprise a linear (e.g., one-dimensional) or two-dimensional array of tiles (e.g., also referred to as elements) disposed as a single row or multiple rows in the shape of a square, rectangle, and/or spherical arc, for example, typically having a center of curvature at the focal spot of the radiation source(s) 118, for example. Respective tiles comprise a plurality of pixels (and corresponding channels) configured to indirectly convert detected radiation into analog signals. For example, respective tiles may comprise a scintillator and an array of photodetectors (e.g., where a photodetector may be referred to as a pixel), although other types of detector configurations are also contemplated. Where a scintillator and an array of photodetectors are utilized, the scintillator is configured to convert incident radiation photons into visible light. The photodetectors receive the visible light generated by the scintillator and generate electrical signals responsive to the visible light. Typically, such photodetectors are photodiodes, but other light converting/detecting components are also contemplated.

Signals that are produced by the detector array 106 may be transmitted to a data acquisition component 122 that is in operable communication with the detector array 106 (e.g., and at least portions of which may be coupled to the tiles of the detector array 106). Typically, the data acquisition component 122 is configured to convert the electrical signals output by respective pixels of the detector array into digital data and/or to combine the digital data acquired during a measuring interval. The collection of digital output signals for a measuring interval may be referred to as a "projection" or a "view". Moreover, an angular orientation of the rotating gantry 104 (e.g., and the corresponding angular orientations of the radiation source(s) 118 and the detector array 106) relative to the object(s) 102 and/or support article 112, for example, during generation of a projection may be referred to as the "projection angle."

The example environment 100 also illustrates an image reconstructor 124 that is operably coupled to the data acquisition component 122 and is configured to generate one or more images representative of the object 102 under examination based at least in part upon signals output from the data acquisition component 122 using suitable analytical, iterative, and/or other reconstruction technique (e.g., tomosynthesis reconstruction, back-projection, iterative reconstruction, etc.). In a CT application, such images may be 3D images, for example, whereas in some other applications, such as line scanners, the images output by the image reconstructor 124 may be 2D images, for example.

The example environment 100 also includes a terminal 126, or workstation (e.g., a computer), configured to receive image(s) from the image reconstructor 124, which can be displayed on a monitor 128 to a user 130 (e.g., security personnel, medical personnel, etc.). In this way, the user 130 can inspect the image(s) to identify areas of interest within the object(s) 102. The terminal 126 can also be configured to receive user input which can direct operations of the object examination apparatus 108 (e.g., a speed of gantry rotation, an energy level of the radiation, etc.).

In the example environment 100, a controller 132 is operably coupled to the terminal 126. In one example, the controller 132 is configured to receive user input from the terminal 126 and generate instructions for the examination unit 108 indicative of operations to be performed.

It will be appreciated that the example component diagram is merely intended to illustrate one embodiment of one type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components to perform additional features, functions, etc. (e.g., such as automatic threat detection).

Figure 2:
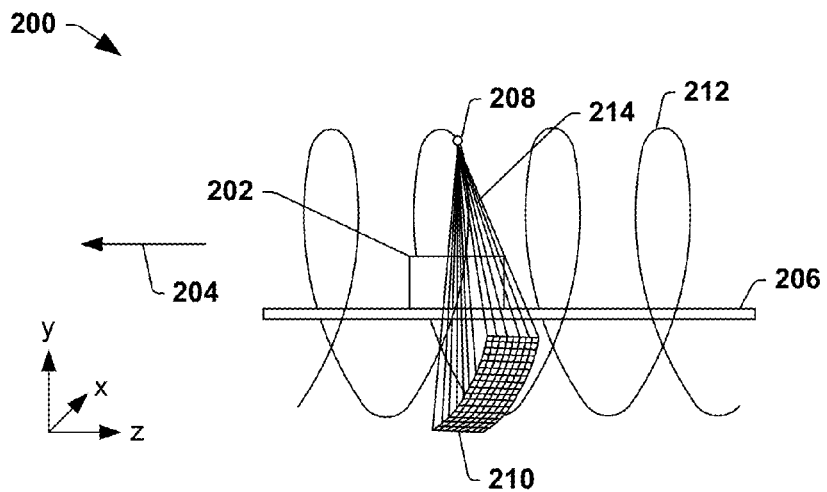
FIG. 2 illustrates a functional diagram of a helical CT imaging modality.

FIG. 2 is a functional diagram 200 of a helical CT imaging modality. In such an imaging modality, an object 202 (e.g., 102 in FIG. 1) under examination is translated 204 (typically at a constant speed) along an axis (e.g., z-axis) via an object support 206 (e.g., 112 in FIG. 1). Typically, while the object 202 is being translated, one or more radiation sources 208 (e.g., 118 in FIG. 1) and/or a detector array 210 (e.g., 106 in FIG. 1) are rotated about the object 202 (in an x and/or y direction), causing the radiation source(s) 208 and/or the detector array 210 to follow a spiral- or helical-like trajectory 212 relative to the object (e.g., where the source and detector array do not move in the z direction, and thus the helical trajectory is established by the combination of the x/y rotation of the source and detector array and the z-axis translation of the object). As the object is translated, data for a prescribed number of slices of the object 202 is acquired via detected radiation 214. It will be appreciated that the z-axis indicates the axial direction along which slices of the object 202 are taken, while the x-axis is one of the coordinates of a plane within which a tile of the detector array may be disposed.

Figure 3:
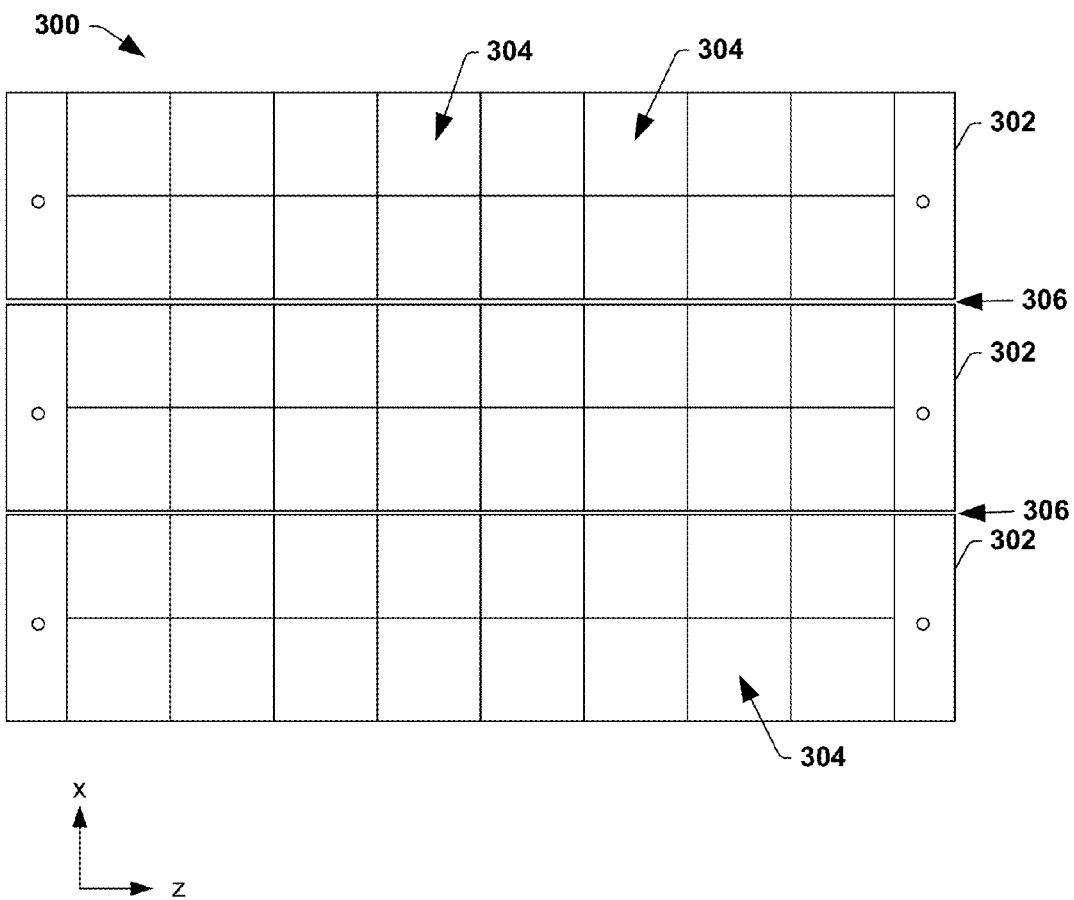
FIG. 3 illustrates a top down view of a portion of an example detector array.

FIG. 3 illustrates a top down view of a portion of an example detector array 300 (e.g., 210 in FIG. 2). As illustrated, the detector array 300 comprises of a plurality of modules 302 (e.g., also referred to herein as super modules), with respective modules 302 comprising one or more rows of one or more tiles 304. For example, in the illustrated embodiment, respective modules 302 are comprised of two rows respectively comprising a plurality of tiles (e.g., extending in the z-direction). It will be appreciated that for purposes of illustration (e.g., to distinguish a first module from a second module), the modules 302 are separated by a gap 306. However, in practice, it may be desirable for modules to be separated by little to no gap.

As will be described in more detail below, respective tiles 304 are typically comprised of a plurality of photodetectors, or pixels (not shown). Also, a typical detector array may comprise 2 to 3 dozen modules 302 (e.g., stacked in the x-direction) arranged in an arc or rectangular shape, for example, with respective modules 302 comprising 8-10 tiles 304 per row. Respective tiles 304 may comprise between 64 and 256 pixels, for example, although a tile 304 may comprise less than 64 or more than 256 pixels. It will be appreciated that the above numbers are merely example numbers intended to provide some perspective, and are not intended to limit the scope of the disclosure, including the scope of the claims.

Figure 4:
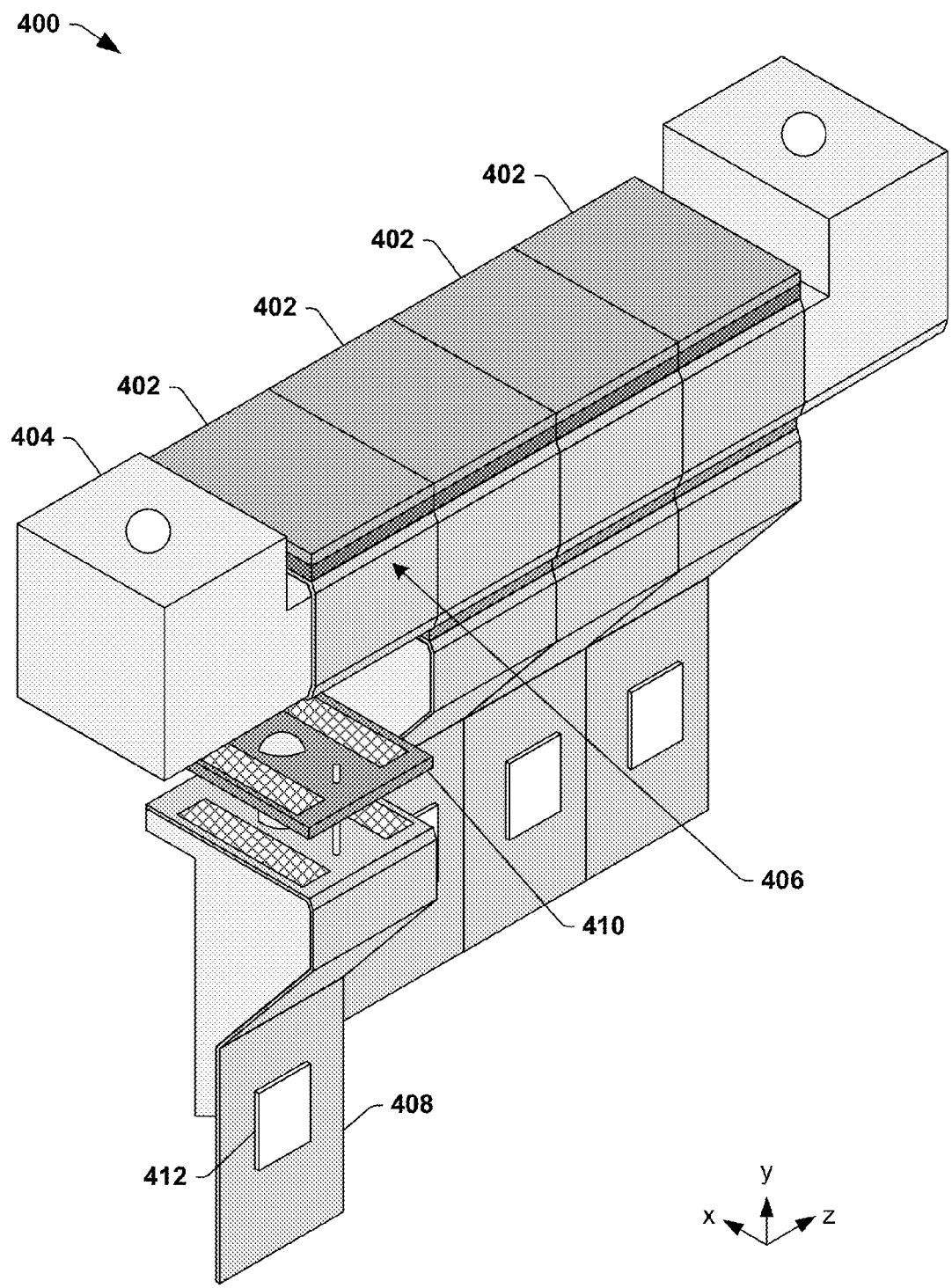
FIG. 4 illustrates a side/perspective view of an example detector module of an example detector array.

FIG. 4 illustrates a side-view of an example detector module 400 (e.g., 302 in FIG. 3) (e.g., also referred to herein as a super module). As illustrated, the example detector module 400 is comprised of a plurality of tiles 402 (e.g., 304 in FIG. 3) that are coupled to a mounting bracket 404 through which the module 400 is physically coupled to other modules and/or to a rotating gantry, for example. As will be described in more detail with respect to FIG. 5, which illustrates an exploded view of an example tile 402, respective tiles 402 are comprised of a detector sub-assembly 406 and an electronic sub-assembly 408 that are selectively coupled together via a connection interface 410. In this way, a signal acquisition system 412 (e.g., ASIC) may be physically decoupled from the detector sub-assembly 406 if the signal acquisition system 412 functions improperly and requires repair and/or replacement, for example.

Moreover, it will be appreciated that as shown, respective tiles 402 may be modular. That is, in one embodiment, a tile 402 of the module 400 can be replaced without removing and/or replacing other tiles 402 of the module 400. It may be appreciated that in some embodiments one or more tiles (or portions thereof) not being replaced may also be manipulated when working on, replacing, etc. one or more other tiles (or portions thereof). Further, there are numerous techniques to secure respective tiles to the mounting bracket 404 to allow the tiles 402 and/or portions thereof (e.g., such as the electronic sub-assembly 408) to be selectively uncoupled from the mounting bracket 404 and/or from other portions of the tile 402. By way of example and not limitation, a screw or cam bolt, for example, may be inserted through a center hole of the electronic sub-assembly 408 to secure the electronic sub-assembly 408 to the mounting bracket 404 and/or to the detector sub-assembly 406. However, other coupling components (e.g., which allow for relatively easy disassembly or uncoupling) are also contemplated.

Figure 5:
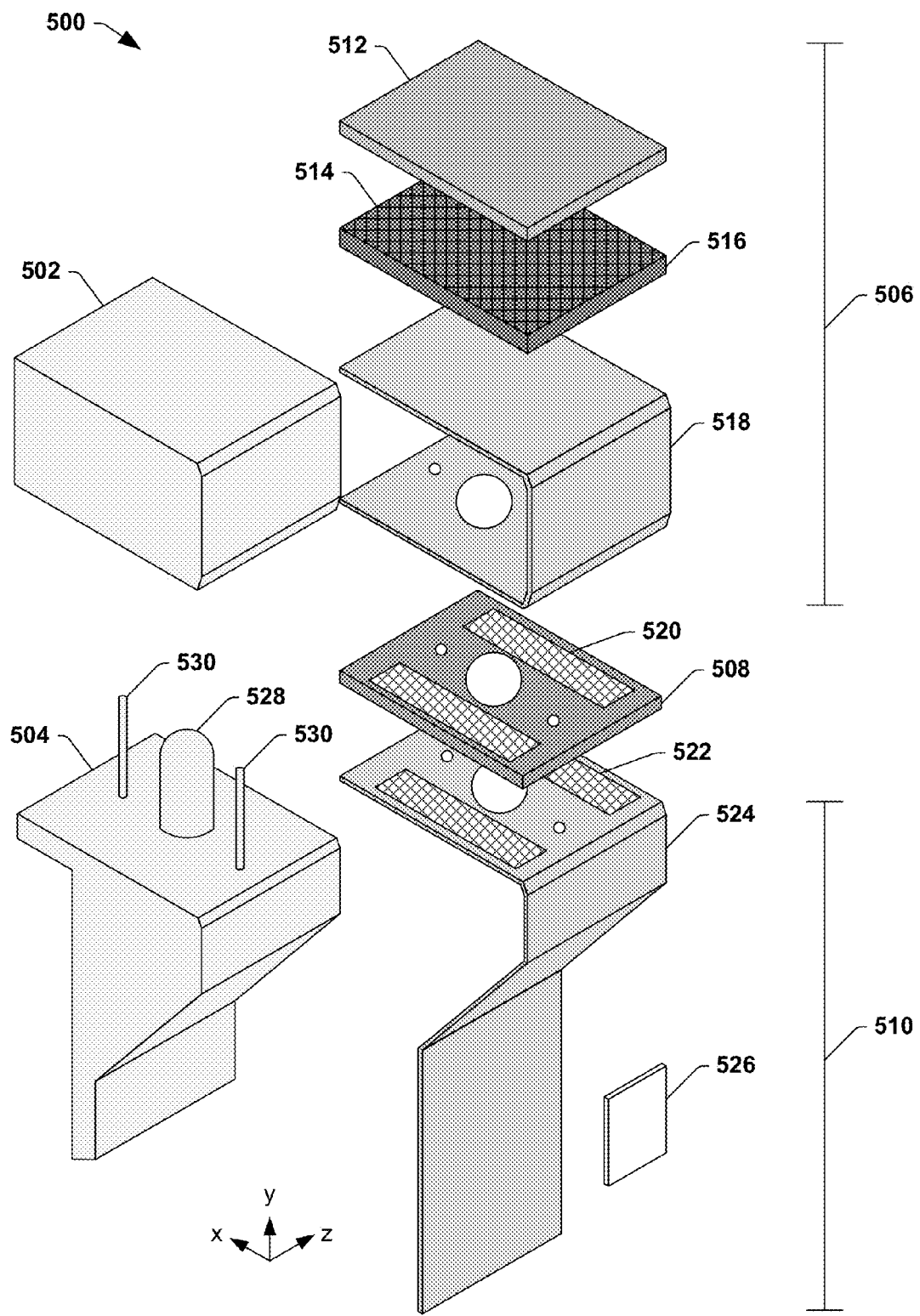
FIG. 5 illustrates an exploded view of an example tile of an example detector module.

FIG. 5 illustrates an exploded view of an example tile 500 (e.g., 402 in FIG. 4), along with a cross-section of mounting brackets 502 (e.g., 404 in FIG. 4) and 504 which may be used to secure the tile 500 to other tiles and/or to support components of the tile 500. By way of example, the mounting brackets 502 and/or 504 may extend in the z direction beyond the z-dimension of the tile 500 to further provide support to other tiles. In this way, a super module (e.g., as shown in FIG. 4) comprising a plurality of tiles may be rigidly supported (e.g., by a single mounting bracket 502) to mitigate flex between tiles, for example.

The tile 500 may be divided into three parts, a detector sub-assembly 506, a connection interface 508, and an electronic sub-assembly 510. The detector sub-assembly 506 comprises a scintillator element 512, a substrate 516, and a first circuit 518. The scintillator element 512 is configured to detect (ionizing) radiation impinging thereon and to convert the radiation into visible light, which can be detected by one or more photodiodes. In this way, the detector sub-assembly 506 may be said to indirectly convert radiation into electrical signals because of the intermediate conversation of radiation into light. It will be appreciated that materials for use as a scintillator are readily known, and are thus not discussed herein.

The detector sub-assembly 506 also comprises a photodetector array 514 (e.g., represented by the grid on top of a substrate 516) comprised of a plurality of photodetectors configured to detect light from the scintillator element 512 and convert the light into electrical signals. It will be appreciated that "pixel" and/or the like may at times be used interchangeably herein with "photodetector" and/or the like. Thus, it may be said that the photodetector array is comprised of a plurality of pixels configured to convert the light generated by the scintillator element 512 into electrical signals. Typically, such pixels or photodetectors are comprised of photodiodes, although other light converting electronic components are also contemplated, for example.

In one embodiment, as shown herein, the array of photodetectors 514 may be disposed on a top surface of the substrate 516 having a top surface and a bottom surface. Further, as will be described in more detail with respect to FIG. 7, the bottom surface of the substrate 516 may comprise a connectivity pattern (e.g., a planar connectivity pattern). One or more through-hole connections may traverse the substrate 516 (e.g., from the top surface to the bottom surface) and operably couple contacts of respective photodetectors of the array 514 to the connectivity pattern on the bottom surface of the substrate 516, for example. Alternatively, the substrate 516 may be comprised of a material that is electrically conducting in one dimension (e.g., a vertical dimension in the illustrated embodiment) and electrically isolating in another dimension (e.g., a horizontal dimension in the illustrated embodiment), which may reduce the need for through-hole connections, for example. In this way, electrical signals generated by the photodetectors of the array 514 can, for example, be transferred from the photodetectors to the connectivity pattern for transmittal to a signal acquisition system 526 (e.g., via the first circuit operatively coupled to a second circuit).

Moreover, in one embodiment, the photodetectors of the photodetector array 514 may be multiplexed in such a way that multiple photodetectors share a common interconnection to the signal acquisition system 526. In this way, connectivity is reduced (e.g., minimized), and the electrical signals generated by the photodetectors in the array 514 may be read sequentially, obviating the need to connect to all of the photodetectors and read them together. By way of example, the multiplexed photodetectors in the array 514 may be read in a row-by-row manner or in a column-by-column manner, for example, with several channels multiplexed to one analog-to-digital converter of the signal acquisition system 526. In this way, the number of connections of the signal acquisition system 526 may be reduced, for example.

The array of photodetectors 514 is operably coupled to at least a portion of the first circuit 518 of the detector sub-assembly 506 via the connectivity pattern on the bottom-side of the substrate 516, to which the first circuit 518 may be physically adjoined, for example. In this way, the electrical signals generated by the photodetector array 514 may be transmitted from the photodetectors to the first circuit 518 for delivery to the signal acquisition system 526, for example.

In one embodiment, the first circuit 518 is constructed of a flexible material, such as a flexible circuit board and/or may have a folded configuration similar to that illustrated in FIG. 5. Such a configuration may allow for a number of features. For example, the flexible nature of the circuit 518 may enable substantially all of the electronics, including the signal acquisition system 526, and/or outside connectivity to be substantially entirely within the area of the photodetector array 514 (e.g., causing the electronics to be shadowed by the detector sub-assembly 506 to mitigate the exposure of the electronics to the radiation). Moreover, in one embodiment, the mounting bracket 502, for example, may be partially comprised of a radiation shield (e.g., may be partially comprised of a material configured to absorb radiation, such as lead) further protecting underlying electronics, such as the signal acquisition system 526 from radiation exposure, for example. Another feature is allowing for space within the tile to insulate or distance the photodetector array 514 from heat generated by underlying electronics, for example.

Although there are numerous benefits to a flexible first circuit 518, such as elasticity and/or mitigation of damage during installation, it will be appreciated that the first circuit may instead be comprised of a substantially rigid material. Moreover, where the first circuit 518 is comprised of a substantially rigid material, the material may be conformed into a shape similar to the illustrated example to achieve at least some of the features described above with respect to the flexible material, for example.

The detector sub-assembly 506 is operably coupled to the electronic sub-assembly 510 via a connection interface 508 comprising a first surface (e.g., a top surface) and a second surface (e.g., a bottom surface). Respective surfaces comprise a connectivity pattern, preferably matched to a connectivity pattern of the circuit to which the surface is physically coupled. For example, the connectivity pattern 520 of the first surface of the connection interface 508 (e.g., a top surface) may be matched to a connectivity pattern of at least a portion of the first circuit 518 to which the first surface comes into physical contact. Similarly, the connectivity pattern of the second surface of the connection interface 508 (e.g., a bottom surface) may be matched to a connectivity pattern 522 of at least some of a second circuit 524 to which the second surface comes into physical contact. In one embodiment, the connectivity pattern of the first and second surfaces may be substantially similar, for example.

Electrical signals generated by the photodetector array 514 are configured to be transmitted from the first circuit 518 to the second circuit 524 via the connectivity patterns (e.g., 520) of the connection interface 508 for delivery to the signal acquisition system 526. For example, in one embodiment, signals are conducted from the connectivity pattern 520 of the first surface of the connection interface 508 to the second surface of the connection interface 508 via one or more through-holes comprised of an electrically conductive material that traverses the connection interface 508 and operably couples the connectivity pattern 520 of the first surface to the connectivity pattern of the second surface, for example. Further, it will be appreciated that the connection interface 508 and/or the electrically conductive material comprised within the through-holes may be comprised of a material that substantially mitigates cross-talk between at least some of the through-hole connections while allowing electrical signals to be transmitted from the first surface to the second surface of the connection interface 508, for example. In this way, interference with electrical signals traveling through a first through-hole caused by electrical signals traveling through a second through-hole may be mitigated, for example. However, other techniques and/or materials for transmitting electrical signals through a connection interface 508 (e.g., while reducing/mitigating cross-talk) are also contemplated. For example, in another embodiment, the connection interface 508 may be comprised of a solid material conductive in a first dimension (e.g., connecting the first circuit 518 to the second circuit 524) and electrically isolating in second and third (or other) dimensions.

In one embodiment, the connection interface 508 comprises a pressure connection (e.g., also referred to as a compression connection), and the coupling between the connection interface 508 and the first circuit 518 and/or the coupling between the connection interface 508 and the second circuit 524 is a pressure coupling. That is, the connection interface 508 may be physically coupled to the first circuit 518 and/or the second circuit 524 via pressure that is applied to the connection interface 508. In this way, when the pressure applied is reduced (e.g., to zero), the connection interface 508 may be uncoupled from the first circuit 518 and/or the second circuit 524 (e.g., to allow the detector sub-assembly 506 to be selectively uncoupled from the electronics sub-assembly 510). Although a pressure connection may be a preferred connection interface 508, it will be appreciated that other types of connection interfaces having features similar to those described above (e.g., limited cross-talk, ease of disconnection from one or both circuits 518 and 524, and/or a number of channels sufficient to transmit the electrical signals) may also and/or instead be utilized in the tile 500.

The connection interface 508 is configured to electrically couple the detector sub-assembly 506 to the electronic sub-assembly 510 such that electrical signals generated by the photodetector array 514 can be processed by a signal acquisition system 526 of the electronic sub-assembly 510. As illustrated, the electronic sub-assembly 510 comprises the second circuit 524 and the signal acquisition system 526 (e.g., which may be part of a data acquisition system (e.g., 122 of FIG. 1)). The second circuit 524 is configured to receive electrical signals from the connection interface 508 and to transmit the received signals to the signal acquisition system 526. Like the first circuit 518, the second circuit 524 may be comprised of a flexible circuit and/or may be comprised of a rigid and/or semi-rigid material.

The signal acquisition system 526, configured to receive electrical signals produced by the photodetector array 514 via the second circuit, 524 is configured to digitize and process the electrical signals. In one embodiment, the signal acquisition system may comprise an application specific integrated circuit (ASIC), although other embodiments of the present disclosure may use signal acquisition systems other than an ASIC. The ASIC may be configured to receive signals from a specified number of channels, such as 64, 128, and/or 256, for example, and the number of channels required by the ASIC may depend upon the number of photodetectors comprised in the photodetector array 514 and/or the manner in which the photodetectors are multiplexed, for example. Although not shown, a connector may be comprised at a bottom of the second circuit 524, for example, where such a connector may be configured to connect data, control and power lines to the next tile and/or module, for example.

It will be appreciated that there are numerous ways to couple components of the tile 500 together. For example, in one embodiment, components of the detector sub-assembly 506 may be coupled together via an adhesive and/or wire bonding such that they are substantially permanently affixed to one another. Moreover, the signal acquisition system 526 may be flip chip soldered and/or wire bonded to the second circuit 524, for example. However, other methods of electrically connecting the components may also be used and are contemplated so as to be comprised within the scope of the appended claims, for example.

Typically, the detector sub-assembly 506 is coupled to the connection interface 508 and/or the electronic sub-assembly 510 via a less permanent coupling. For example, in one embodiment, a fastener 528, such as a cam-bolt and/or a screw may be inserted through mounting bracket 504 and/or through apertures of the electronic sub-assembly 510 and/or the connection interface 508 to selectively couple the detector sub-assembly 506 to the electronic sub-assembly 510 and/or to selectively couple mounting bracket 504 to mounting bracket 502 (e.g., to which the detector sub-assembly 506 is attached), for example. It will be appreciated that "fastener" and/or the like is intended to be used in a broad sense to comprise any material(s) and/or mechanism(s) that (selectively) secure the detector sub-assembly 506 to the electronic sub-assembly 510 and/or vice-versa. By way of example and not limitation, the fastener 528 may be a cam-bolt, screw, clamp, and/or clip, etc. Further, one or more alignment pins 530, for example, may be utilized to align the second circuit 524, the connection interface 508, and/or the first circuit 518, for example. For example, at least portions of at least one of the detector sub-assembly 506 and/or the electronic sub-assembly 510 may comprise apertures (e.g., illustrated as small holes through the second circuit 524 and the connection interface 508) through which the one or more alignment pins 530 may be inserted. Again, it will be appreciated that the instant disclosure is not intended to be limited to these types of connections, but instead are merely listed herein as example types of connections. For example, other mechanisms and/or techniques may be utilized to align the second circuit 524, the connection interface 508, and/or the first circuit 518. By way of example and not limitation, such alignment may be achieved via edge alignment and/or fixturing.

Figure 6:
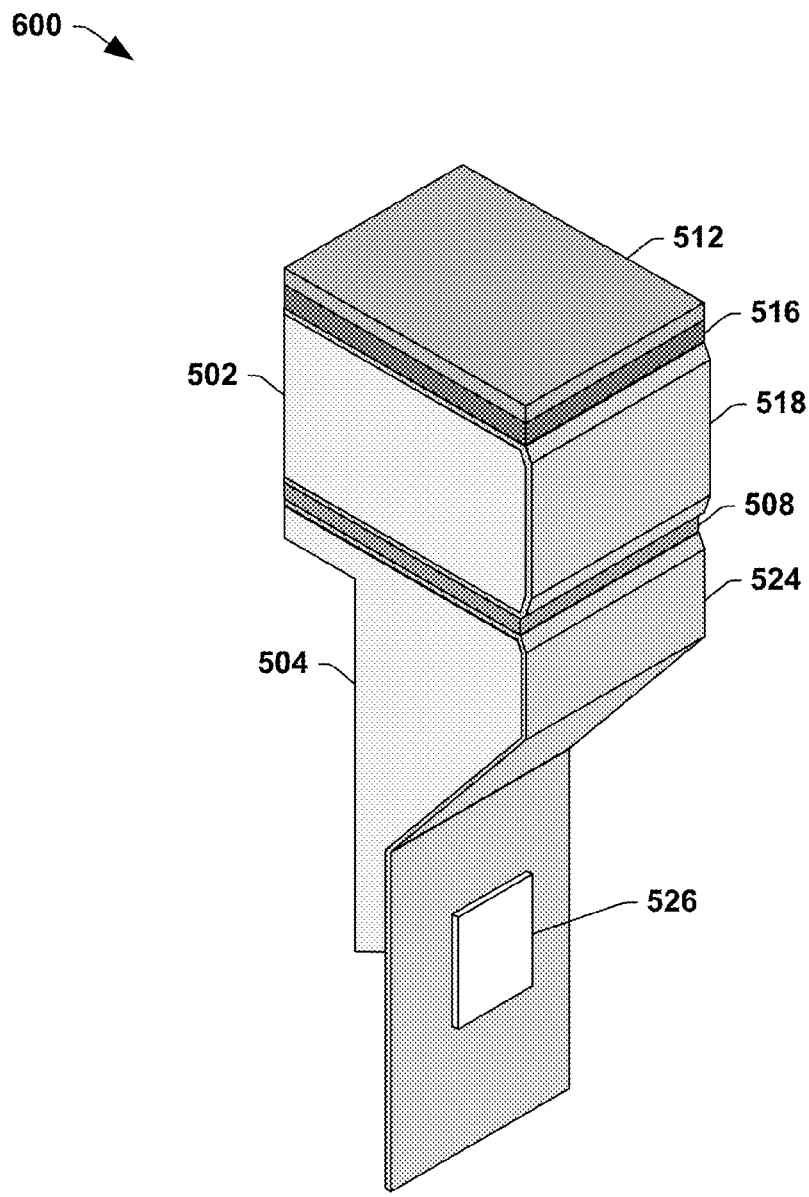
FIG. 6 illustrates an assembled view of an example tile of an example detector module.

FIG. 6 illustrates an assembled tile 600 (e.g., 402 in FIG. 4) substantially comprising the components described in FIG. 5, with similar reference characters being provided to further assist in illustrating how the components may be assembled or connected together. As previously mentioned, it will be appreciated that although the mounting brackets 502, 504 are illustrated as aligning with an edge of the tile, in one or more embodiments, one or both of the mounting brackets 502, 504 may extend in the z-direction and/or in the x-direction to provide for coupling additional tiles to the mounting bracket (e.g., such that there may be multiple rows and/or columns of tiles coupled to a same mounting bracket to form a super-module), for example.

Figure 7A:
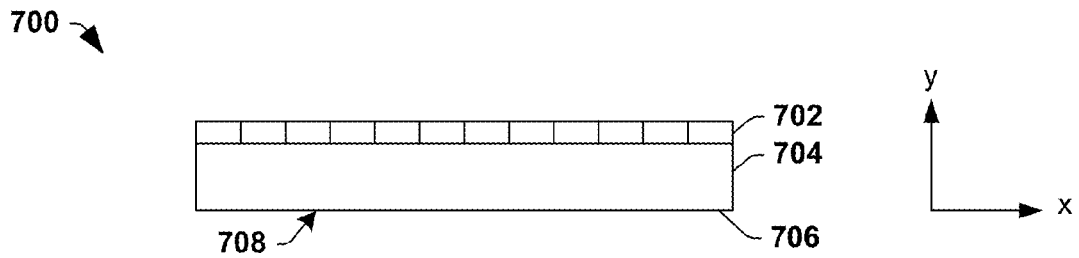
FIG. 7(a) illustrates a side-view of an example photodetector array assembly of an example tile.
Figure 7B:
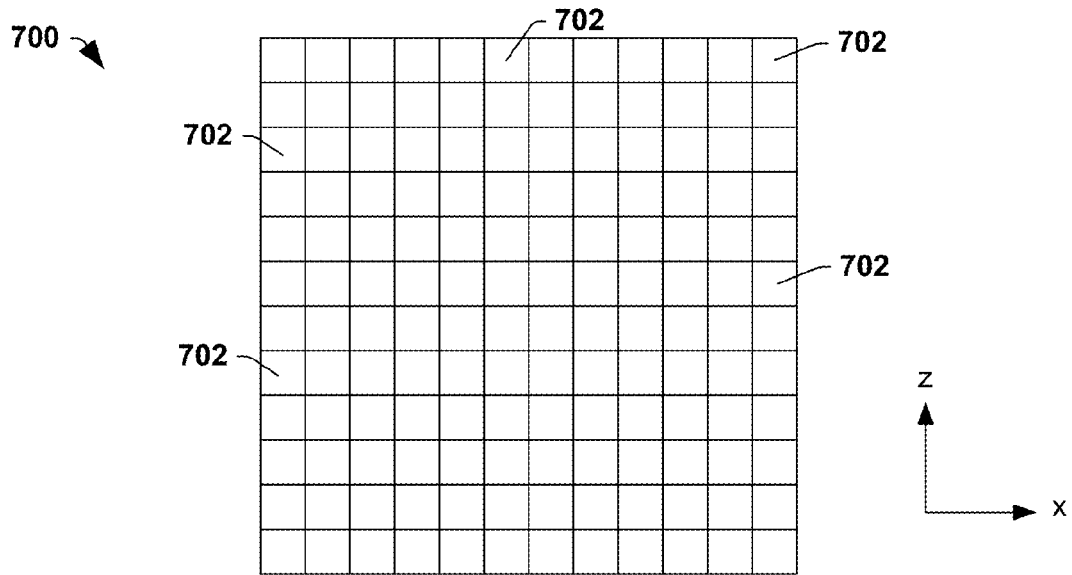
FIG. 7(b) illustrates a top-down view of an example photodetector array assembly of an example tile.
Figure 7C:
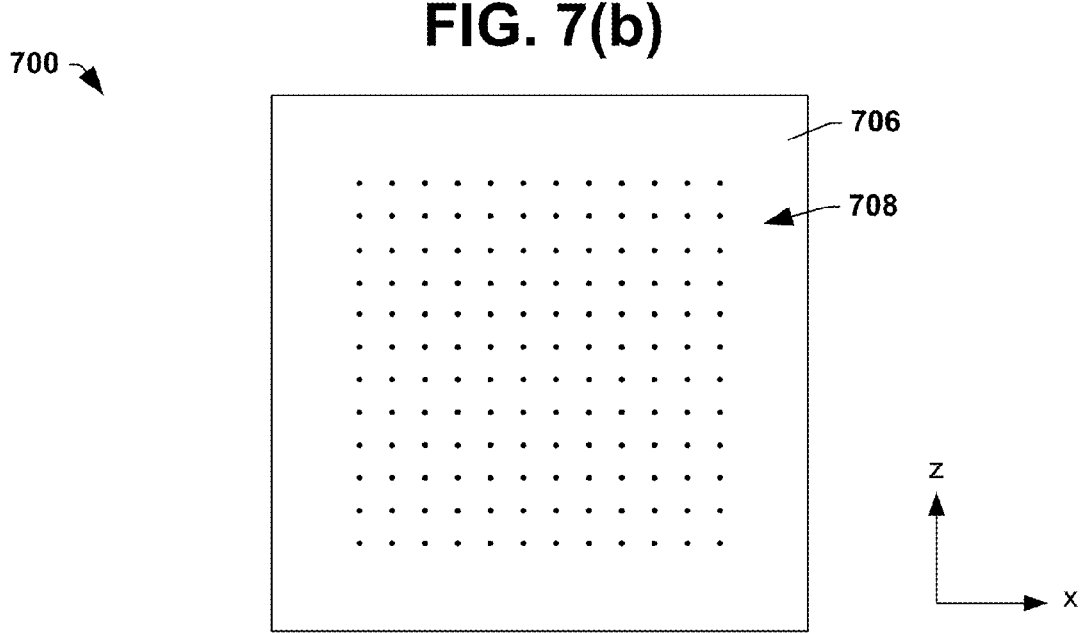
FIG. 7(c) illustrates a bottom-up view of an example photodetector array assembly of an example tile.

FIGS. 7(a)-7(c) illustrate a photodetector array assembly 700 of an example tile (e.g., 500 in FIG. 5), whereby an array of photodetectors 702 (e.g., 514 in FIG. 5) are disposed on a top surface of a substrate 704 (e.g., 516 in FIG. 5) and a connectivity pattern 708 is disposed on a bottom surface 706 of the substrate 704, in accordance with one embodiment of the present disclosure. More particularly, as illustrated in FIG. 7(a), the photodetector array assembly 700 comprises "N" number of photodetectors 702, a first substrate 704, and a connectivity pattern 708 located on a bottom surface 706 of the first substrate 704. It will be appreciated that while continued reference is made herein to a single substrate, the assembly 700 may be comprised of a plurality of different substrates that have been adhered and/or fused together. For example, the array of photodetectors 702 may be disposed on a top surface of a first substrate and the connectivity pattern may be disposed on a bottom surface of a second substrate, with the first and second substrates being physically coupled together, for example. Such a substrate may be comprised of, among other things, a silicon material, an organic material, a ceramic material, and/or another material through which signals may be electrically conducted (e.g., either through though-holes and/or other electrically conductive materials arranged in and/or comprising the substrate).

As shown in FIG. 7(b), which illustrates a top-down view of the photodetector array assembly 700, a plurality of photodetectors 702 may be arranged and/or mounted on the top surface of the substrate 704. For example, in the illustrated embodiment, "N" may be equal to 144 photodetectors 702, or pixels; although in other embodiments other values of "N" may be used. Typically, the photodetectors 702 are arranged to cover substantially the entire area of the top surface of the substrate 704. Further, while the photodetectors 702 appear arranged in a substantially rectangular or square shape, in different embodiments the photodetectors 702 may be arranged to form substantially different shapes, such as circular arrays, for example.

As shown in FIG. 7(c), which illustrates a bottom-up view of the photodetector array assembly 700, a connectivity pattern 708 may be disposed on the bottom 706 of the substrate 704. In one embodiment, respective photodetectors 702 may be mapped to a contact of the connectivity pattern 708 such that there is a 1-1 ratio of contacts to photodetectors 702. Although, in other embodiments, there may be fewer contacts in the connectivity pattern 708 than there are photodetectors 702 due to multiplexing (e.g., as described above). Further, as described above, one or more through-hole connections may traverse the substrate (e.g., or multiple substrates where the photodetector array assembly 700 is comprised of multiple substrates) to operably couple respectively photodetectors 702 with a contact(s) of the connectivity pattern 708, for example. However, other techniques and/or materials (e.g., besides and/or in combination with the through-hole connections) may be utilized to conduct electrical signals through the substrate 704.

FIG. 8 illustrates a side-view of another embodiment of an example detector module 800 (e.g., 302 in FIG. 3). As illustrated, the example detector module 800 is comprised of a plurality of tiles 802 (e.g., 304 in FIG. 3) that are coupled to a mounting bracket 804 through which the module 800 is physically coupled to other modules and/or to a rotating gantry, for example. As will be described in more detail with respect to FIG. 9, which illustrates an exploded view of an example tile 802, respective tiles 802 are comprised of a detector sub-assembly and an electronic sub-assembly that are selectively coupled together via a connection interface. In this way, a signal acquisition system (e.g., ASIC) may be physically decoupled from the detector sub-assembly if the signal acquisition system functions improperly and requires repair and/or replacement, for example.

Moreover, it will be appreciated that respective tiles 802 may be modular. That is, in one embodiment, a tile 802 of the module 800 can be replaced without removing and/or replacing other tiles 802 of the module 800. It will be appreciated that although merely a single row of tiles are illustrated, a detector module 800 may be comprised of multiple rows and/or a detector array may be comprised of multiple modules 800. Thus, the tiles 802 may be considered to be modular in both the x- and z-directions, for example, because a portion of any one or more of the tiles 802 may be replaced without necessarily affecting other tiles of the detector array and/or while mitigating the effect on other tiles.

Figure 9:
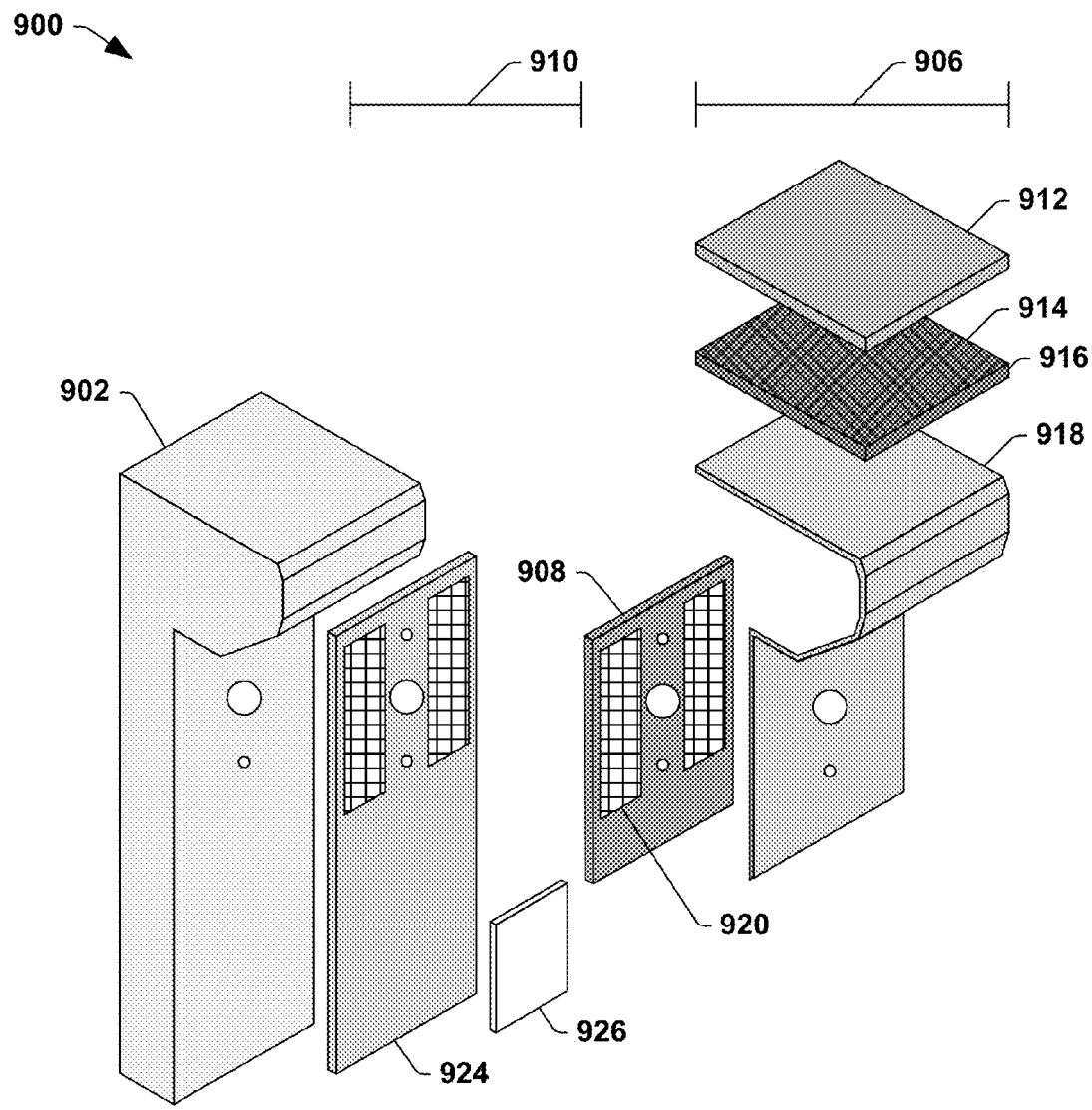
FIG. 9 illustrates an exploded view of an example tile of an example detector module.

FIG. 9 illustrates an exploded view of an example tile 900 (e.g., 802 in FIG. 8), along with a cross-section of a mounting bracket 902 (e.g., 804 in FIG. 8) that may be used to secure the tile 900 to other tiles and/or to support components of the tile 900, for example. By way of example, the mounting bracket 902 may extend in the x-direction and/or z-direction beyond the x-dimension and/or z-dimension, respectively, of the tile 900 to further provide support to other tiles. In this way, a super module (e.g., as shown in FIG. 8) comprising a plurality of tiles may be rigidly supported (e.g., by a single mounting bracket 502) to mitigate flex between tiles, for example.

It will be appreciated that for purposes of brevity, components similar to those of FIG. 5 may provide similar features/functions unless otherwise noted. Thus, the components will not be described in the same detail as above, although the same/similar attributes may be assigned to like components unless otherwise provided.

The tile 900 may be divided into three parts, a detector sub-assembly 906, a connection interface 908, and an electronic sub-assembly 910. The detector sub-assembly 906 comprises a scintillator element 912, a photodetector array 914, and a first circuit 918. The photodetector array 914 (e.g., represented by the grid on top of a substrate 916) is comprised of a plurality of photodetectors, which are operably coupled to the first circuit 918 of the detector sub-assembly 906.

The detector sub-assembly 906 is operably coupled to the electronic sub-assembly 910 via the connection interface 908. It will be appreciated that while the connection interface 508 illustrated in FIG. 5 comprises connectivity patterns (e.g., 520) on surfaces substantially parallel to a detection surface of the scintillator 512 (e.g., a top and bottom surface), the connection interface 908 of FIG. 9 provides for the connectivity patterns (e.g., such as connectivity pattern 920) being on surfaces substantially perpendicular to a detection surface of the scintillator 912 (e.g., a front surface and a back surface of the connection interface 908). Although specific reference is made herein to the connectivity patterns being on surfaces substantially parallel to (e.g., as shown in FIG. 5) and substantially perpendicularly to (e.g., as shown in FIG. 9) a detection surface of the scintillator, it will be appreciated that, more generally, the connectivity patterns may be on a surface that is angled at virtually any angle relative to the detection surface. For example, in another embodiment, the surface comprising the connectivity pattern may be at a 45 degree angle relative to the detection surface of the scintillator.

Electrical signals generated by the photodetector array 914 are configured to be transmitted from the first circuit 918 to the electronic sub-assembly 910 via the connectivity patterns (e.g., 920) of the connection interface 908. As illustrated, the electronic sub-assembly 910 comprises a second circuit 924 and a signal acquisition system 926 (e.g., which may be part of a data acquisition system (e.g., 122 of FIG. 1)). In the illustrated embodiment, the second circuit 924 is a rigid circuit, where the second circuit 524 described with respect to FIG. 5 is a flexible circuit. In another embodiment, the second circuit 924 may be a flexible circuit. Although not shown, a connector may be comprised at a bottom of the second circuit 924, for example, where such a connector may be configured to connect data, control and power lines to the next tile and/or module, for example.

It will be appreciated that there are numerous ways to couple components of the tile 900 together. For example, in one embodiment, components of the detector sub-assembly 906 may be coupled together via an adhesive and/or wire bonding such that they are substantially permanently affixed to on another. Moreover, the signal acquisition system 926 may be flip chip soldered and/or wire bonded to the second circuit 924, for example. However, other methods of electrically connecting the components may also be used and are contemplated so as to be comprised within the scope of the appended claims, for example.

Typically, the detector sub-assembly is coupled to the connection interface 908 and/or the electronics sub-assembly 910 via a less permanent coupling such as via coupling components described above. Further, one or more alignment pins, for example, may be utilized to align the second circuit 924, the connection interface 908, and/or the first circuit 918, for example. By way of example, at least portions of at least one of the detector sub-assembly 906 and/or the electronic sub-assembly 910 may comprise apertures (e.g., illustrated as small holes through the second circuit 924 and the connection interface 908) through which the one or more alignment pins may be inserted. Again, it will be appreciated that the instant disclosure is not intended to be limited to these types of connections, but instead are merely listed herein as example types of connections.

Figure 10:
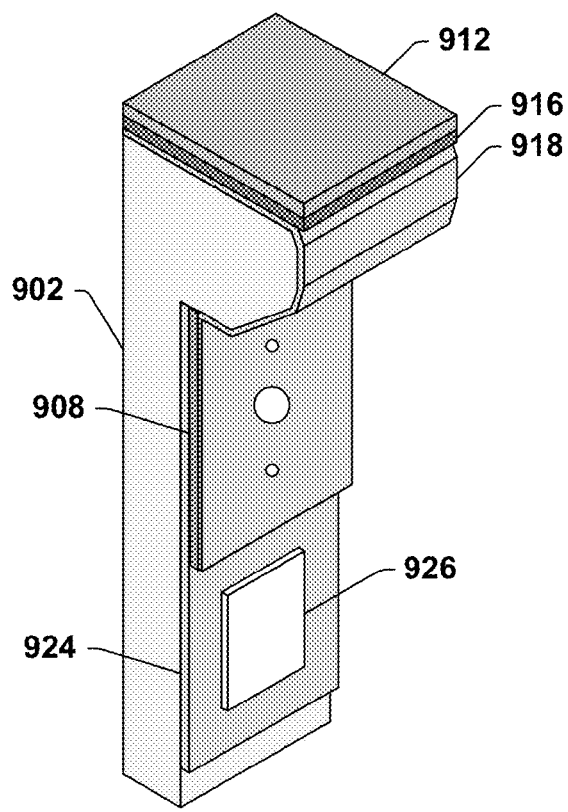
FIG. 10 illustrates an assembled view of an example tile of an example detector module.

FIG. 10 illustrates an assembled tile 1000 (e.g., 802 in FIG. 8) substantially comprising the components described in FIG. 9, with similar reference characters being provided to further assist in illustrating how the components may be assembled or connected together. As previously mentioned, it will be appreciated that although the mounting bracket 902 is illustrated as aligning with an edge of the tile, in one or more embodiments, the mounting bracket 902 may extend in the z-direction and/or in the x-direction to provide for coupling additional tiles to the mounting bracket 902 (e.g., such that there may be multiple rows and/or columns of tiles coupled to a same mounting bracket to form a super-module, for example.

It may be appreciated that "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A tile for an indirect-conversion radiation detector assembly, comprising:
   a detector sub-assembly comprising:
      a scintillator element;
      a substrate having a top surface and a bottom surface;
      an array of photodetectors disposed on the top surface of the substrate and coupled with the scintillator element;
      a first connectivity pattern disposed on the bottom surface of the substrate and electrically coupled to the array of photodetectors; and
      a first circuit coupled to the first connectivity pattern;
   an electronic sub-assembly comprising:
      a second circuit coupled to a signal acquisition system;
      a connection interface for coupling the first circuit to the second circuit; and
      a mounting bracket for selectively coupling at least one of the electronic sub-assembly or the connection interface to the detector sub-assembly.

2. The tile of claim 1, the connection interface comprising a pressure connector.

3. The tile of claim 1, the connection interface comprising a first surface and a second surface and the connection interface configured to conduct electrical signals from the first surface to the second surface.

4. The tile of claim 1, the connection interface configured to conduct electrical signals in a first direction and to isolate electrical signals from moving in a second direction.

5. The tile of claim 1, the connection interface comprising a material configured to mitigate cross-talk between a first electrical signal passing through the connection interface and a second electrical signal passing through the connection interface concurrently with the first electrical signal.

6. The tile of claim 3, the first surface of the connection interface in physical contact with the first circuit and the second surface of the connection interface in physical contact with the second circuit.

7. The tile of claim 1, the signal acquisition system configured to process electrical signals generated by the array of photodetectors and comprising as least one application specific integrated circuit (ASIC).

8. The tile of claim 1, at least one of the first circuit or the second circuit comprising a flexible material.

9. The tile of claim 1, at least some photodetectors of the array of photodetectors multiplexed to share a common interconnection to the signal acquisition system.

10. The tile of claim 1, the substrate comprising at least one of a silicon material, an organic material, or a ceramic material.

11. A tile for an indirect-conversion radiation detector assembly, comprising:
a detector sub-assembly comprising:
a scintillator element,
an array of photodetectors coupled to the scintillator element, and
a first circuit, coupled to the array of photodetectors, for delivering a signal generated by a first photodetector of the array of photodetectors to a signal acquisition system;
an electronic sub-assembly comprising:
the signal acquisition system; and
a second circuit for delivering the signal to the signal acquisition system; and
a connection interface for coupling the first circuit to the second circuit to provide for selectively decoupling and recoupling the detector sub-assembly with the electronic sub-assembly.

12. The tile of claim 11, at least one of:
the detector sub-assembly comprising one or more apertures through which one or more alignments pins are inserted; or
the electronic sub-assembly comprising one or more apertures through which one or more alignments pins are inserted.

13. The tile of claim 11, comprising a fastener for selectively recoupling the detector sub-assembly with the electronic sub-assembly.

14. The tile of claim 11, the connection interface configured to transfer the signal between the first circuit and the second circuit.

15. The tile of claim 11, the connection interface comprising a pressure connector.

16. The tile of claim 11, the signal acquisition system configured to process the signal and comprising as least one application specific integrated circuit (ASIC).

17. An imaging system, comprising:
a radiation source configured to emit radiation; and
a detector array comprising a plurality of selectively removable tiles configured to detect at least some of the radiation; at least one of the plurality of selectively removable tiles comprising:
a detector sub-assembly comprising:
a scintillator element,
an array of photodetectors coupled to the scintillator element, and
a first circuit coupled to the array of photodetectors
an electronic sub-assembly comprising:
a signal acquisition system, and
a second circuit coupled to the signal acquisition system, and
a connection interface for operably coupling the first circuit to the second circuit to provide for selectively decoupling and recoupling the detector sub-assembly with the electronic sub-assembly.

18. The system of claim 17, the detector array comprising at least one of: a one dimensional array, a two dimensional array, a substantially rectangular array, a substantially square array, or a substantially arcuate array.

19. The system of claim 17, the radiation source comprising an ionizing radiation source.

20. The system of claim 17, at least one of the radiation source or the detector array configured for rotation about an object under examination by the imaging system.

* * * * *